(12) United States Patent
Hall et al.

(10) Patent No.: US 8,050,709 B2
(45) Date of Patent: Nov. 1, 2011

(54) WIRELESS PRINTER CONFIGURATION MODULE

(75) Inventors: Lyman Leonard Hall, Nampa, ID (US); Gary D. Zimmerman, Garden Valley, ID (US)

(73) Assignee: Marvell International Technology Ltd. (BM)

( * ) Notice: Subject to any disclaimer, the term of this patent is extended or adjusted under 35 U.S.C. 154(b) by 315 days.

(21) Appl. No.: 10/990,022

(22) Filed: Nov. 16, 2004

(65) Prior Publication Data

US 2006/0105714 A1    May 18, 2006

(51) Int. Cl.
*H04M 1/00* (2006.01)
*H04B 1/38* (2006.01)
*G03B 27/00* (2006.01)
*G03G 15/00* (2006.01)
*G03G 15/32* (2006.01)

(52) U.S. Cl. ....... 455/556.1; 455/557; 355/18; 355/133; 101/494; 101/2

(58) Field of Classification Search ............... 455/554.2, 455/555, 556.1, 557; 355/18, 133; 101/2, 101/407.1, 483, 494
See application file for complete search history.

(56) References Cited

U.S. PATENT DOCUMENTS

| | | | |
|---|---|---|---|
| 6,912,374 B2 * | 6/2005 | Clough et al. ............... | 455/41.2 |
| 2002/0159090 A1 | 10/2002 | Nobutani et al. | |
| 2002/0169002 A1 * | 11/2002 | Imbrie et al. ................. | 455/557 |
| 2003/0002073 A1 * | 1/2003 | Berkema et al. ............. | 358/1.15 |
| 2003/0054766 A1 | 3/2003 | Clough et al. | |
| 2003/0100335 A1 * | 5/2003 | Gassho et al. ................ | 455/552 |
| 2003/0156567 A1 * | 8/2003 | Oak .............................. | 370/338 |
| 2003/0181203 A1 | 9/2003 | Cheshire | |
| 2004/0082309 A1 * | 4/2004 | Smith ........................... | 455/344 |
| 2004/0141487 A1 * | 7/2004 | Lee ............................... | 370/338 |
| 2005/0044479 A1 * | 2/2005 | Willams et al. ............ | 715/500.1 |
| 2005/0059379 A1 * | 3/2005 | Sovio et al. ................... | 455/411 |
| 2005/0157329 A1 * | 7/2005 | Park et al. .................... | 358/1.15 |
| 2005/0272420 A1 * | 12/2005 | Matsuda et al. ........... | 455/426.2 |
| 2006/0067295 A1 * | 3/2006 | Lehotsky et al. ............. | 370/351 |

FOREIGN PATENT DOCUMENTS

| | | |
|---|---|---|
| JP | 2002-236561 | 8/2002 |
| JP | 2003-163668 | 6/2003 |
| JP | 2004-159258 | 6/2004 |
| JP | 2004-320162 | 11/2004 |

OTHER PUBLICATIONS

Microsoft Corporation, "Windows XP Wireless Deployment Technology and Component Overview", pp. 1-43; (2004). <www.microsoft.com/technet>.
Microsoft Corporation. "Windows Connect Now", pp. 1-34; (2004). <www.microsoft.com/whdc/.

(Continued)

*Primary Examiner* — Andrew Wendell (57) ABSTRACT

A printer comprises a print mechanism and a wireless communication module including a wireless transceiver and a configuration module. The configuration module is adapted to electronically query at least one available wireless device to determine at least one wireless security parameter of the at least one available wireless device and to receive a response from the queried at least one available wireless device, via the wireless transceiver, for configuring the printer for wireless association in a wireless computing network including the at least one available wireless device.

23 Claims, 4 Drawing Sheets

OTHER PUBLICATIONS

UK Intellectual Property Office, Examination Report Under Section 18(3) for Patent Application No. GB0521654.4, Sep. 29, 2008, Great Britain.

The Patent Office of the People's Republic of China, Examination Report for Patent Application No. 200510114985.1, Oct. 17, 2008, China.

State Intellectual Property Office of the People's Republic of China: Text of the Third Office Action, Application No. 2005101149851, dated Jul. 10, 2009, 7 pgs.

State Intellectual Property Office of the People's Republic of China; Translation of Text of the Fourth Office Action; Application No. 2005101149851; dated Feb. 24, 2010; (8 pgs.).

Japanese Patent Office; Translation of Summary of Notice of Reasons for Rejection; Patent Application No. 2005-331518; dated Sep. 7, 2010, pp. 1-3.

Japanese Patent Office; Japanese Language and English translation of Summary of Decision of Rejection; Patent Application No. 2005-331518; dated Apr. 26, 2011, pp. 1-3.

Gakugai Hitoshi, "Consideration on Review and Introduction of Wireless LAN security" Security Magazine, vol. 8 Shoeisha, pp. 76-79, Apr. 1, 2003.

Ken Okuama, "Wireless LAN—Wireless Internet Realizing Wireless Broadband, Mobile Internet" vol. 1, No. 10, RIC Telecom, pp. 62-67, Nov. 10, 2001.

* cited by examiner

WIRELESS PRINTER CONFIGURATION MODULE

BACKGROUND

Wireless communication has revolutionized telephone communication and computer connectivity. No longer constrained by wired connections, users move freely about with their computers, telephones and other electronic devices.

However, most conveniences come with a price. For wireless communication, the price is configuring each device to properly communicate with other desired devices while excluding communication with unauthorized interlopers. Wired communications sidestep some of these concerns simply by controlling which devices are in wired connection with each other. For wireless communication, physical connection is no longer a means of protecting communication between different electronic devices.

Accordingly, many prominent organizations and manufacturers of wireless communication have developed communication protocols for wireless devices aimed at controlling the how, when, where, and who of communication between wireless devices to create boundaries between authorized and unauthorized wireless communication. These protocols specify, among other things, the type of wireless network, methods of encryption and/or authentication, access control, as well as the unique identities of the different available networks of wireless devices. As the level of intrusion by sophisticated hackers has risen, the number and complexity of wireless communication protocols has risen to keep pace with the efforts of these privacy interlopers.

Given the current thicket of information required to set up a wireless network or to configure a single device for association with an existing wireless network, many consumers struggle to properly configure their wireless devices to operate in the intended network environment. The level of technical information required to perform installation of wireless devices has driven consumers to lean heavily upon technical support centers for help in configuring wireless devices.

SUMMARY

One aspect of the invention provides a printer comprising a print mechanism and a wireless communication module including a wireless transceiver and a configuration module. The configuration module is adapted to electronically query at least one available wireless device to determine at least one wireless security parameter of the at least one available wireless device and to receive a response from the queried at least one available wireless device, via the wireless transceiver, for configuring the printer for wireless association in a wireless computing network including the at least one available wireless device.

DETAILED DESCRIPTION

In the following detailed description, references made to the accompanying drawings, which form a part hereof, and which is illustrated by way of illustrations specific embodiments in which the invention may be practiced. In this regard, directional terminology, such as "front," "back," etc., is used with reference to the orientation of the figures(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention enable a consumer to readily configure a printer for association in a wireless network. In one embodiment, a printer comprises a configuration module adapted to query available wireless devices to obtain parameters regarding available wireless networks. For example, these parameters may include names of wireless networks, security protocols, keys for authentication and/or encryption, etc. The configuration module of the printer receives responses to the query and then presents selectable wireless network parameters to a user. Based upon user-selection, the configuration module establishes association of the printer in one or more available wireless networks according to the selected parameters.

Embodiments of the present invention enable a consumer to bypass manually obtaining parameters of available wireless networks (from the different wireless devices in those networks) prior to configuring a wireless printer. In particular, a consumer no longer needs to how to manually access wireless network parameter information in each of the respective wireless device(s) and/or wireless network(s), nor needs to actually gather that parameter information themselves. Moreover, these embodiments enable configuration of the wireless printer without having to previously configure a host, without using a mobile memory device to physically transfer wireless network parameters between other devices and the printer, and/or without having to host a mobile memory device at the printer to enable wireless configuration.

Instead, with embodiments of the invention, a consumer merely has to make limited selections from a menu (or prompts) of a graphical user interface based on wireless network parameters obtained from querying the available network(s) and/or devices.

Figure 1:
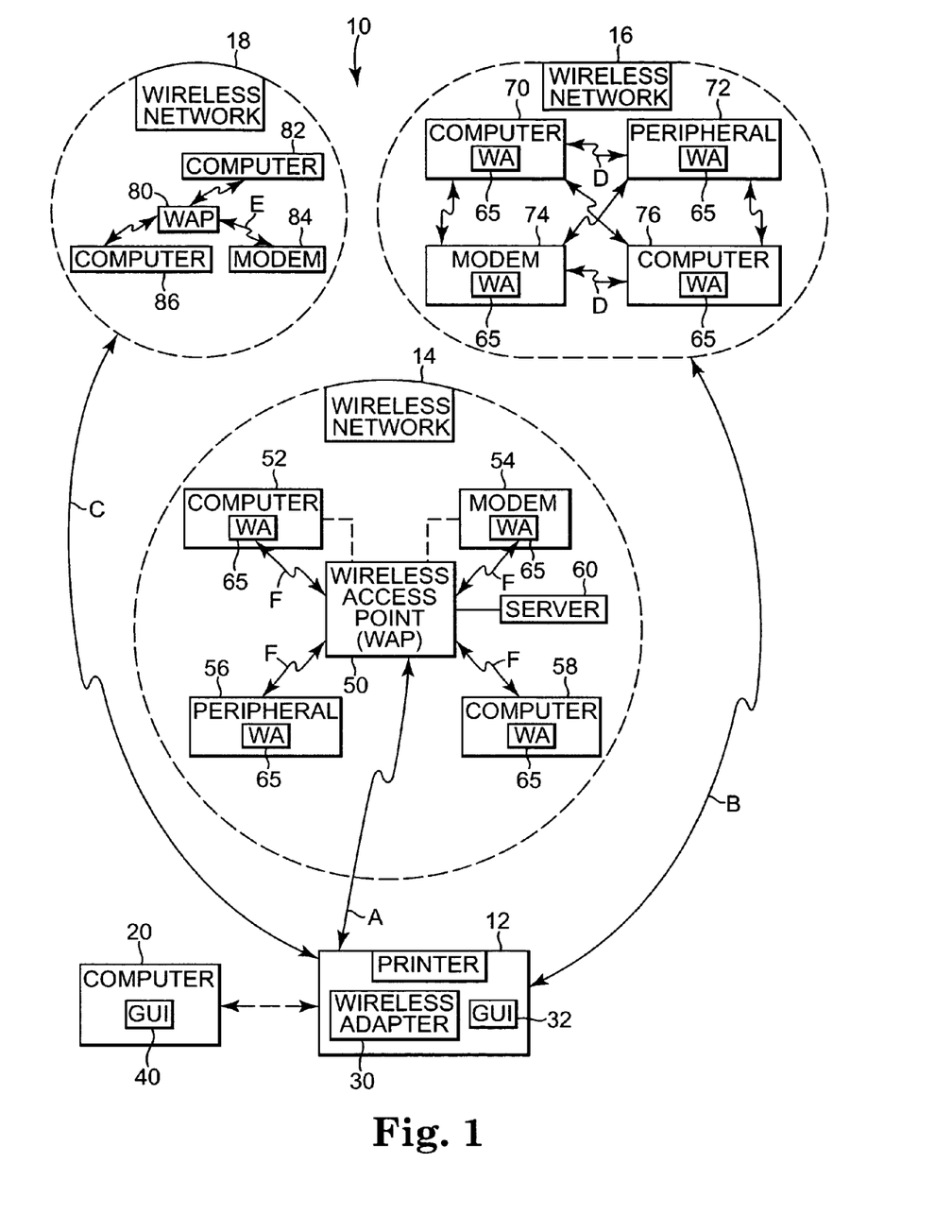
FIG. 1 is a schematic illustration of a wireless printer in a wireless computing environment, according to an embodiment of the present invention.

FIG. 1 is schematic illustration of a wireless communication environment 10 including a wireless printer 12, according to one embodiment of the invention. As shown in FIG. 1, wireless computing environment 10 includes wireless printer 12, first wireless computing network 14, second wireless computing network 16, and third wireless computing network 18. In one embodiment, wireless computing environment 10 further comprises computer 20.

Wireless printer 12 comprises wireless adapter 30 and graphical user interface (GUI) 32. When properly configured, wireless adapter 30 enables printer 12 to communicate wirelessly in association with the devices of one or more first, second, and third wireless networks 14, 16 or 18. In one embodiment, wireless adapter (WA) 30 is a network interface card (NIC) enabling wireless communication according to a WiFi® or 802.11 wireless communication protocol, or other wireless communication protocols. Graphical user interface 32 enables operation of printer 12 as well as providing a mechanism to configure printer 12 for wireless communication in first, second, and third wireless networks 14, 16, and/or 18. Printer 12 is further described in association with FIGS. 2-4.

First wireless network 14, second wireless network 16, and third wireless network 18 each comprise a potentially available wireless network to which printer 12 can be associated. Each of the first, second, and third wireless networks 14, 16, 18 includes a respective wireless pathway A, B, C through which printer 12 can communicate with each respective network. In one embodiment, each of the first, second, third wireless networks 14, 16, 18 comprise a wireless local area network (WLAN). In one embodiment, wireless computing environment 10 comprises only one or two of the first, second, and third wireless networks 14, 16, 18 while in other embodiments, wireless computing environment 10 comprises all three of the first, second, and third wireless networks 14, 16, 18 or more than three networks.

First wireless network 14 comprises a wireless computing network operating in an infrastructure mode with one or more wireless access points as a basic service set (BSS) or extended service set (ESS). First wireless network 14 comprises wireless access point (WAP) 50 and computer 52, modem 54, peripheral 56, computer 58, and server 60, each of which include wireless adapter 65. Wireless access point 50 is configured for providing a central point of wireless communication along wireless pathways (F) between multiple wireless devices, such as computer 52, modem 54, peripheral 56 and computer 58. In one embodiment, wireless adapter 65 is a network interface card enabling wireless communication according to a WiFi® or 802.11 wireless communication protocol with other similarly configured wireless adapters. Accordingly, wireless adapter 65 enables each of computer 52, modem 54, peripheral 56, and computer 58 to communicate wirelessly with each other via wireless access point (WAP) 50. When printer 12 is properly configured, printer 12 communicates in association with devices of first wireless network 14 via wireless access point 50.

In one embodiment of first wireless network 14, one or more of computer 52, modem 54, peripheral 56, computer 58, and server 60 can be omitted from network 14 or additional similar devices can be added to first wireless network 14.

Second wireless network 16 comprises a wireless computing network of devices operating in ad hoc mode without a central wireless access point, which is sometimes referred to as an independent basic service set (IBSS). Second wireless network 16 comprises several devices, each including wireless adapter 65, such as computer 70, peripheral 72, modem 74, and computer 76, which wireless communicate with each other in a peer-to-peer relationship via wireless pathways D. Accordingly, each device in the second wireless network 16 effectively acts as a wireless access point for another peer in the network. Wireless adapter(s) 65 have substantially the same features as wireless adapter 65 of second wireless network 14, except for being configured to communicate in an ad hoc mode. When properly configured, printer 12 wirelessly communicates in an ad hoc mode (i.e., peer-to-peer relationship) in association with any one or more of device in second wireless network 16 along wireless communication pathway B.

Third wireless network 18 comprises a wireless computing network operating in an infrastructure mode, and having substantially the same features and attributes as first wireless network 14. Network 18 comprises wireless access point (WAP) 80 and computer 82, modem 84, and computer 86, each of which include wireless adapter 65 (not shown). When properly configured, printer 12 wirelessly communicates in association with any one or more of device in wireless network 16 along wireless communication pathway C.

In one embodiment, wireless adapters 30 and 65 are configured for communication using wireless network communication protocols in addition to and/or other than the 802.11 wireless communication protocol.

In one embodiment, computer 20 comprises graphic user interface (GUI) 40 and is in wired communication with printer 12. Graphic user interface 40 enables a user to access and configure wireless adapter 30 of printer 12 in embodiments of printer 12 that lack graphical user interface 32.

Using wireless adapter 30, printer 12 queries networks 14, 16, and 18 to determine what devices and/or networks are available that printer 12 can associate with in a wireless network. In one embodiment, wireless adapter 30 of printer 12 queries wireless access point 50 of wireless network 14, wireless adapters 65 of the devices in second wireless network 16, and wireless access point 80 in third wireless network 18. As further described in association with FIGS. 2-5, printer 12 uses responses to those queries to configure itself for association in one or more of first, second, and third wireless networks 14, 16, and 18 of wireless computing environment 10.

Figure 2:
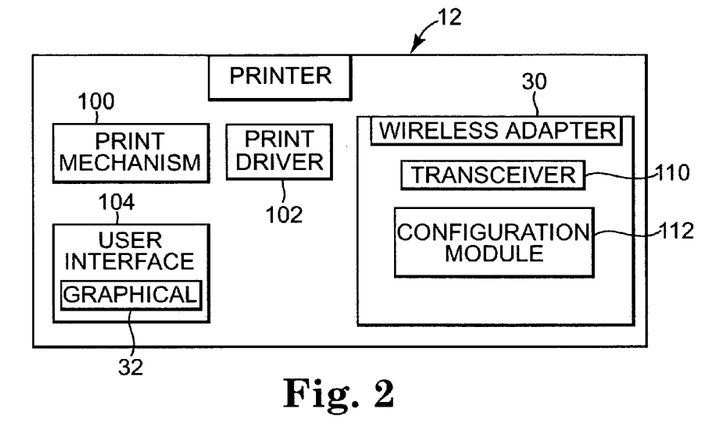
FIG. 2 is a block diagram of a wireless printer, according to an embodiment of the present invention.

FIG. 2 is a block diagram of wireless printer 12, according to one embodiment of the invention. As shown in FIG. 2, printer 12 comprises wireless adapter 30, print mechanism 100, print driver 102, and user interface 104. Print mechanism 100 enables printer 12 to print ink onto media while print driver 102 and user interface 104 controls general operation of printer 12, as well known in the art. In one embodiment, printer 12 comprises a multifunction device configured to perform any one or more of faxing, scanning, copying, and printing.

In one embodiment, user interface 104 provides limited ability to control printer 12 through simple function keys. In another embodiment, user interface 104 of printer 12 includes graphical user interface 32 adapted to enhance a user ability to enter selections and operate print 12, such as through menu-driven modules, and having the same features and attributes of graphical user interface (GUI) 32 as previously described in association with FIG. 1.

As shown in FIG. 2, wireless adapter 30 of printer 12 comprises wireless transceiver 110 and configuration module 112. Wireless transceiver 110 enables wireless communication between other similarly equipped devices, as known in the art. In one embodiment of the invention, configuration module 112 comprises an aspect of wireless adapter 30 and/or an aspect of print driver 102.

In one embodiment, configuration module 112 enables a user to configure printer 12 for association in a wireless network (e.g. first, second, or third wireless network 14, 16, 18) of a wireless computing environment 10. In particular, configuration module 112 equips transceiver 110 to query other available wireless device(s) and/or wireless network(s) to obtain parameters enabling their network wireless communication. In one embodiment, configuration module 112 takes advantage of aspects of 802.11i communication protocol in which all wireless devices are configured to respond to queries requiring the queried device to provides its wireless network parameters. Of course, wireless devices also can selectively deactivate this query-response feature to make this information about wireless network parameters unavailable to unauthorized users. However, this query-response feature is advantageous when activated for a user configuring a printer within their own known wireless network, in which queries by a printer to other device is authorized and welcome, and sharing of the wireless network parameters with the printer 12 is desired.

Using this query-response feature of available wireless devices, configuration module 112 gathers wireless network parameters, such as network names, security protocols, and/or keys for authentication/encryption, from all available wireless device(s) and/or network(s) and then presents them to a user for appropriate selection to associate printer 12 with a wireless network. Additional features of configuration module 112 of printer 12 are further described in association with FIGS. 3-5.

Figure 3:
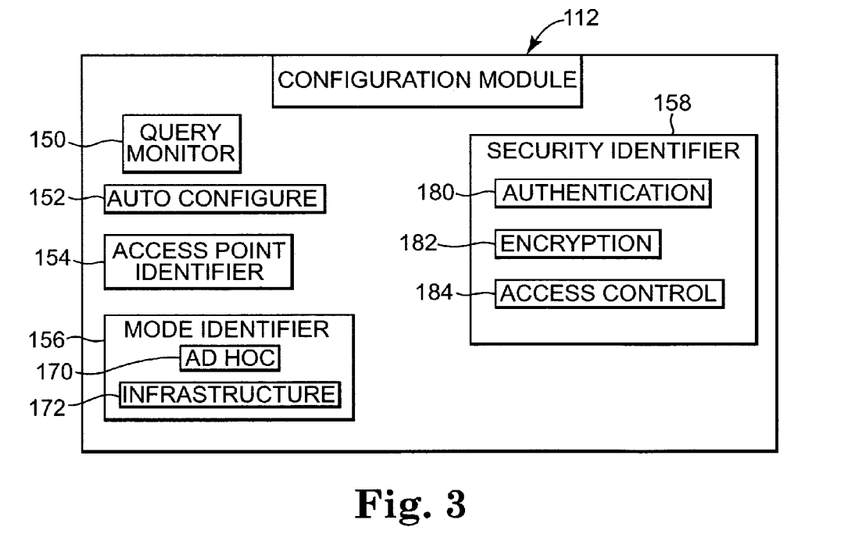
FIG. 3 is a block diagram of a wireless printer configuration module, according to another embodiment of the present invention.

FIG. 3 is a block diagram of configuration module 112 of printer 12, according to an embodiment of the invention. As shown in FIG. 3, configuration module 112 comprises query monitor 150, auto-configure module 152, access point identifier 154, mode identifier 156, and security identifier 158. Mode identifier 156 comprises ad hoc module 170 and infrastructure module 172. Security identifier 158 comprises authentication module 180, encryption module 182, and access control module 184. In one embodiment, authentication module 180, encryption module 182, and access control module 184 have aspects that are interrelated and hence, these modules operate cooperatively, interdependently and/or complimentarily with each other, as well as other modules or components of a wireless communication security protocol.

Query monitor 150 of configuration module 112 enables control over wirelessly querying other wireless devices for their wireless network parameters including optional deactivation of this feature. In one embodiment, query monitor 150 displays on graphical user interface 32 which device(s) and/or network(s) have been queried, and which ones have responded by providing their wireless network parameters to printer 12.

Autoconfigure module 152 of configuration module 112 is selectively activated to enable configuration module 112 to automatically designate wireless network parameters for printer 12, after all available devices/networks have been queried and after a user has selected a wireless network. In particular, in situations where there are a finite number of wireless device(s) and only one or two wireless networks, configuration module 112 recommends settings for each wireless network parameter. This feature is further described in association with FIG. 5. Autoconfigure module 152 includes a small database and index of potential settings for wireless network parameters, along with commonly grouped sets of parameters. This database and recommended setting are based on typical wireless network configurations that are known to those skilled in the art, but which are generally not known to most consumers.

Access point identifier module 154 of configuration module 112 identifies, via query monitor 150, wireless access points for any available wireless networks that printer 12 with which printer can be associated. For any peer-to-peer or ad hoc networks, each device within those networks effectively comprises a wireless access point for printer 12.

Mode identifier module 156 of configuration module 112 identifies, via query monitor 150, whether a queried device operates in ad hoc mode or infrastructure mode, and then enables user selection to operate in one of those two modes, as facilitated respectively by ad hoc module 170 and infrastructure module 172.

Security identifier module 158 of configuration module 112 identifies, via query monitor 150, various security aspects of wireless network parameters for each queried device and/or network and then enables user-selection of corresponding security parameters for printer 12 based on responses to the query. In particular, security identifier module 158 uses an authentication module 180, an encryption module 182, and/or an access control module 184 (as well as related modules and components of a security protocol) to ascertain corresponding security parameters in each queried device and enables setting of those respective parameters in printer 12. Various aspects of a security protocol for a wireless device may include security features, such as authentication, encryption, access control, etc. that are interrelated, cooperative, interdependent, and/or complimentary. Accordingly, modules 180, 182, 184 of configuration module 112 are illustrative of a potential organizational structure of a given security protocol, so that security identifier module 158 is not limited to this particular combination of modules to express all of the security parameters of a wireless security protocol. Consequently, the examples of these security parameters, and known protocols, is merely illustrative and is not exhaustive.

In one embodiment, security identifier module 158 of configuration module 112 queries for and designates wireless network parameters for printer 12 as described below. Additional specific examples of these protocols and/or parameters as described and illustrated in association with FIG. 4.

As shown in FIG. 3, in one embodiment, authentication module 180 of security identifier module 158 queries for and designates authentication-related parameters and protocols, such as extensible authentication protocol (EAP) and all its progeny and variants, such as lightweight extensible authentication protocol (LEAP), protected extensible authentication protocol (PEAP), extensible authentication protocol-transport security layer (EAP-TLS), extensible authentication protocol-tunneled transport security layer (EAP-TTLS), etc.

In one embodiment, encryption module 182 of security identifier module 158 queries for and designates encryption-related parameters and protocols, such as a wired equivalency privacy (WEP) protocol, an 802.11 advanced encryption standard (AES) protocol, counter mode with cipher block chaining message authentication code (CCMP) protocol, etc. In one embodiment, access control 184 of security identifier 158 queries for and designates access-related parameters and protocols, such as medium access control (MAC) to implement address filtering for controlling which users and/or devices are eligible for association with a wireless network. As additional, newer security and privacy communication standards and protocols become available, these newer standards and protocols will be queried and available for designation in security identifier module 158 of configuration module 112 as one of the wireless network parameters for configuring printer 12.

Figure 4:
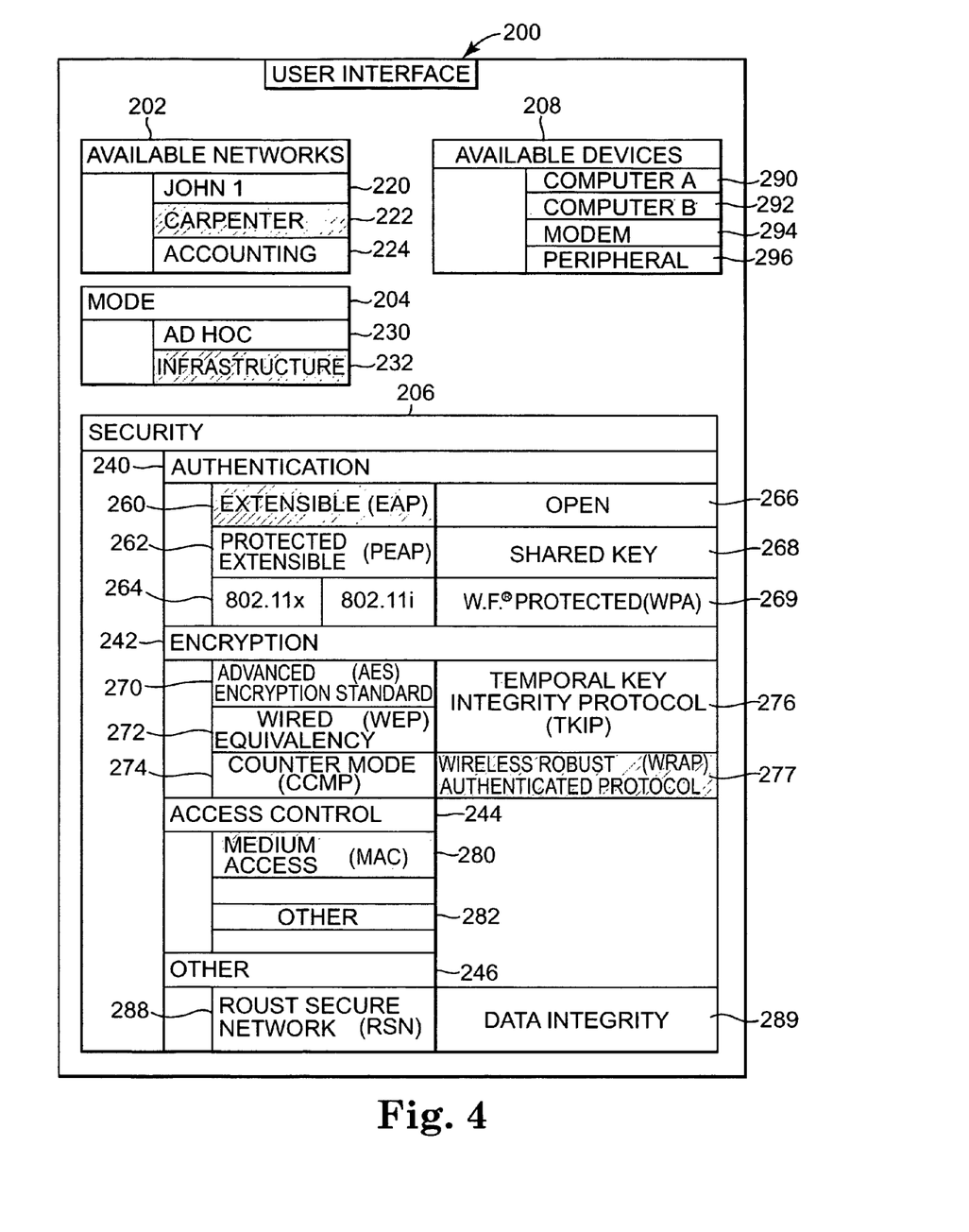
FIG. 4 is a block diagram of a configuration user interface, according to another embodiment of the present invention.

FIG. 4 is a block diagram of a user interface 200, according to one embodiment of the present invention. User interface 200 is generated by, and supported by the functions of configuration module 112 of printer 12 and is displayed and operable via either graphical user interface 32 of printer 12 and/or graphical user interface 40 of computer 20.

As shown in FIG. 4, user interface 200 comprises available networks module 202, available devices module 208, mode module 204, and security module 206. Each module 202-208 displays available settings, enables selection of a parameter setting, and/or displays a completed selection for each respective parameter. Accordingly, each module comprises a selector module to enable a user to make selections of wireless network security parameters. A parameter which has been recommended and/or selected by the user is highlighted in the menu by shading, as shown in FIG. 4, or by other visually conspicuous features (e.g., colors, flashing fonts, bold fonts, etc). The recommended settings and/or lists of available devices, parameters, etc. in user interface 200 are generated based upon responses of the nearby devices/networks from queries by printer 12.

Available network module 202 of user interface 200 displays a list of available wireless networks, which includes ad hoc and/or infrastructure networks listed by their respective network name or service set identifier (SSID), such as JOHN 1 220, CARPENTER 222, and ACCOUNTING 224. Mode module 204 identifies a selected network (user-selected in available network module 202) as an ad hoc network 230 or as an infrastructure network 232. Other newer network modes that become available would also be selectable choices in mode module 204.

Available device module 208 of user interface 200 displays a list of available network devices, which generally includes a list of wireless access points corresponding to respective infrastructure-mode networks and a list of available devices corresponding to devices available in an ad hoc-mode network. As an example, one list of available devices includes computer A 290, computer B 292, modem 294 and peripheral 296.

Security module 206 of user interface 200 displays a list of available security parameters including authentication parameters 240, encryption parameters 242, access control parameters 244, and other parameters 246. In one embodiment, these available security parameters include, but are not limited to, the parameters previously described in association with configuration module 112 of printer 12 in FIG. 3.

Authentication parameters 240 include extensible authentication protocol (EAP) 260, and protected extensible authentication protocol (PEAP) 262, as well as all its progeny and variants which are not specifically listed in FIG. 4, such as lightweight extensible authentication protocol (LEAP), extensible authentication protocol-transport security layer (EAP-TLS), and extensible authentication protocol-tunneled transport security layer (EAP-TTLS), etc.

Authentication parameters 240 additionally include 802.11x and/or 802.11i security protocols 264, open authentication (OPEN) protocol 266, shared key authentication (SHARED KEY) protocol 268, and WiFi® protected access (WPA) protocol 269, among other protocols known in the art but not listed.

Encryption parameters 242 include, but are not limited to, advanced encryption standard (AES) protocol 270, wired equivalency privacy (WEP) protocol 272 (and its variants), counter mode with cipher block chaining message authentication code (CCMP) protocol 274, temporal key integrity (TKIP) protocol 276, and wireless robust authenticated (WRAP) protocol 277. Access control parameter 244 includes medium access control (MAC) protocol 280 and other protocols 282. Other security parameters 246 include, but are not limited to, protocols distinct from those previously listed, as well as protocols that are variants and/or related to those previously listed for associating printer 12 with a wireless network. In one embodiment, other security parameters 246 include robust secure network (RSN) protocol 288 and data integrity or message integrity protocols 289.

Accordingly, using the listed parameters in user interface 200 of configuration module 112 of printer 12, a user can readily select, via graphical user interface 32 (or graphical user interface 40), appropriate parameters for wireless configuring printer 12 for network association without having to independently and manually obtain these parameters from individual devices and/or networks, as would be conventionally required.

Finally, a single wireless communication security protocol, such as those listed in FIG. 4, typically includes both an authentication component and an encryption component, so that a listing of a known protocol in FIG. 4 under either an authentication heading or an encryption heading is understood as not limiting the known protocol to strictly operating as only an authentication protocol or only as an encryption protocol.

Figure 5:
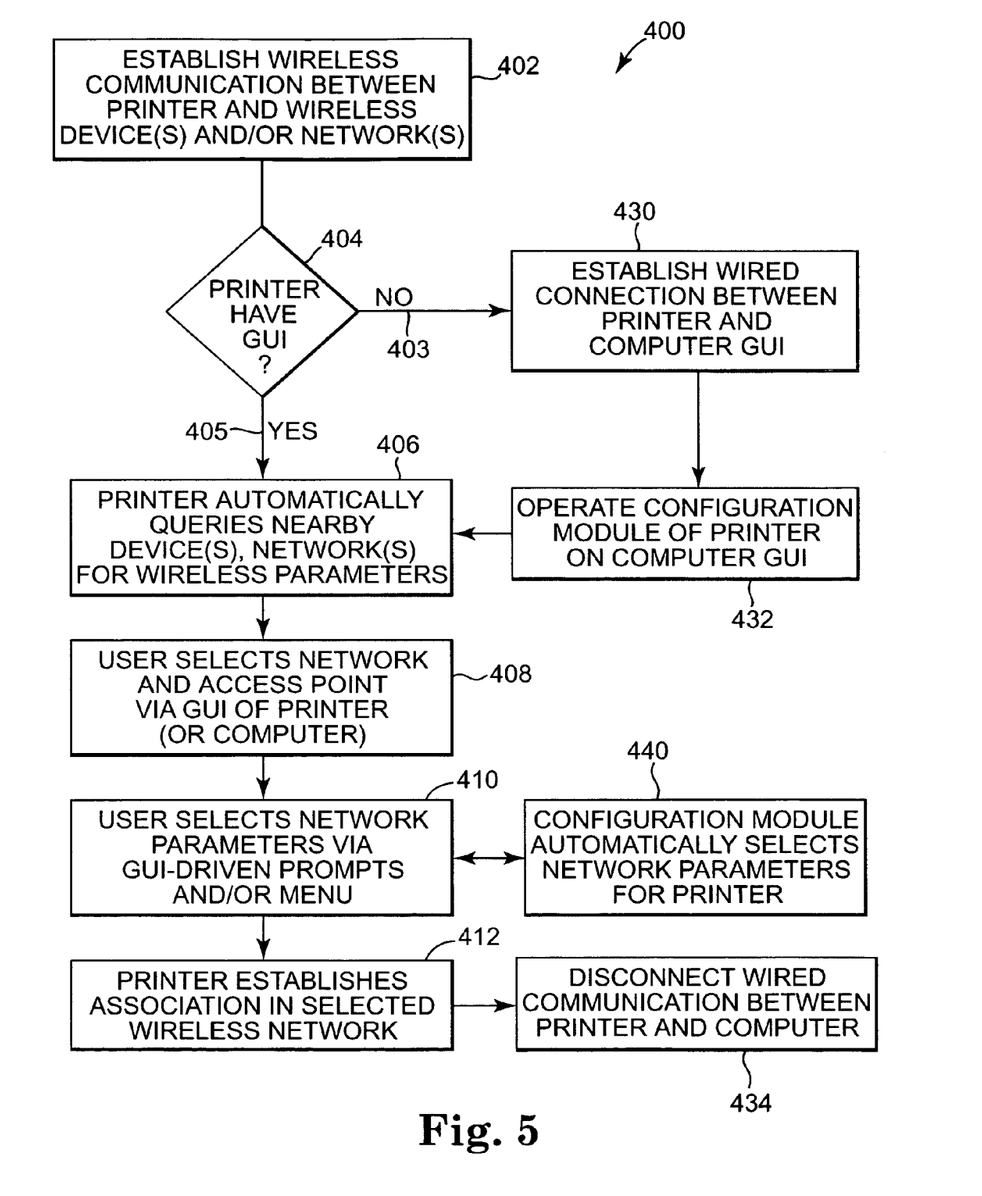
FIG. 5 is a flow diagram of a method of configuring a wireless printer, according to another embodiment of the present invention.

FIG. 5 is a flow diagram of a method 400 of configuring a wireless printer, according to an embodiment of the invention. In one embodiment, method 400 is performed using devices and/or modules, such as printer 12 and configuration module 112, as previously described in association with FIGS. 1-4. As shown in FIG. 5, at 402, method 400 comprises establishing wireless communication between a wireless printer and available wireless device(s) and/or network(s). This wireless communication does not grant access privileges or network association privileges to printer 12 but merely enables printer 12 and available device(s) and/or network(s) to transmit and receive limited information sufficient for printer 12 and available device to exchange queries and responses about their communication parameters. In one embodiment, this communication is performed by a scanning mode of a wireless adapter, such as wireless adapter 30, of the wireless printer which scans for channels of communication between nearby devices and/or networks.

At 404, method 400 comprises the user determining whether the printer has a graphical user interface capable of displaying and enabling operation of a wireless network configuration module, such as configuration module 112, of the printer. If the printer does have a sufficient graphical user interface, then at 406 the printer automatically queries nearby device(s) and/or network(s) for their wireless network communication parameters. At 408, via the graphical user interface (such as user interface 200), the user selects a wireless network for association with the printer, including a wireless access point. At 410, via the graphical user interface, the user selects network parameters for printer 12 from a list or menu of available settings so that the settings of printer 12 correspond to the settings of the selected wireless network. In one embodiment, a configuration module automatically recommends a comprehensive group of settings, obtained from the query of available devices, that would enable the printer to be associated in the selected wireless network. Using the selected wireless network parameters of printer, the printer establishes an association in the selected wireless network.

In one embodiment, the printer lacks a graphical user interface sufficient to display and operate a user interface (such as user interface 200) of a configuration module of the printer, as represented by path 403 from decision box 404. Accordingly, at 430 the user establishes a wired connection between the printer and a computer that has a graphical user interface capable of displaying and operating user interface of configuration module of the printer. At 432, the configuration module is operated via the graphical user interface of the computer which enables performing various aspects of method 400, including those aspects of method 400 shown at 406, 408, and 410. After the printer is configured for association in a selected wireless network, at 434, a user disconnects computer from the printer so that the printer 12 is no longer in wired connection to the computer.

In one embodiment, at 440, method 400 comprises the configuration module automatically selecting wireless network parameters for the printer based upon the query responses provided by the queried device(s) and network(s), after user-selection of a wireless network. This feature effectively relies on recommended settings from those skilled in the art for recognizable network configurations that would otherwise be generally unknown to a consumer operating the configuration module.

Various modules in embodiments of the invention, such as configuration module 112 and others shown and described in association with FIGS. 1-5, are implemented as software, hardware, and/or firmware, etc. Multiple modules can be combined into a single module, while one or more functions of a single module can be segregated into distinct modules and/or submodules.

Embodiments of the invention enable a relatively unsophisticated consumer to configure a wireless printer for association in a wireless network without having to know or ascertain, before attempting the configuration, all of the wireless network parameters of the devices and/or networks to which user desires to associate the printer. A configuration module of the printer, operable through a graphical user interface, enables the consumer to participate in and monitor the configuration. The configuration module automatically performs an electronic query of available devices/networks to determine their wireless network parameters, and then provides recommended parameters for configuring the printer. This configuration module eases the burden on a consumer by reducing the amount of knowledge required to successfully associate the printer with a wireless network, and saves the user from the conventionally required work in manually obtaining security parameters of an existing wireless network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printer comprising:
    a printing mechanism;
    a wireless communication module including:
        a wireless transceiver configured for communication with a plurality of simultaneously present wireless networks;
        a configuration module in communication with the wireless transceiver, wherein the configuration module communicates according to at least one wireless communication security protocol and is configured to:
            electronically query the wireless networks to determine wireless network parameters associated with the wireless networks, the wireless network parameters used to configure the printer for association with one of the wireless networks among the plurality of wireless networks, the electronic query in accordance with the at least one wireless communication security protocol;
            receive responses from the wireless networks that include the wireless network parameters; and
            identify wireless networks among the plurality of simultaneously present wireless networks that are available for association with the printer based on the received responses; and
    a user interface in communication with the configuration module and configured to:
        receive information about the identified wireless networks from the configuration module;
        display at least a part of the information about the wireless networks identified by the configuration module;
        enable selection of a wireless network among the identified wireless networks displayed on the user interface for association of the printer in the wireless network; and
        send the selection of the wireless network to the configuration module in order for the configuration module to associate the printer in the selected wireless network.

2. The printer of claim 1 wherein the configuration module comprises:
    a wireless access point identifier configured to identify any wireless access points of the wireless networks available for wireless communication with the printer.

3. The printer of claim 2 wherein the wireless access point identifier is configured to identify a one or more service set identifiers associated with the wireless networks.

4. The printer of claim 1 wherein the configuration module comprises:
    a network type identifier configured to identify one or more types of operating modes of the wireless computing networks as at least one of an ad hoc network and an infrastructure network.

5. The printer of claim 1 wherein the at least one wireless communication security protocol comprises one of:
    an 802.11x security protocol; and
    an 802.11i security protocol.

6. The printer of claim 1 further comprising:
    an authentication protocol identifier configured to enable configuration of the printer for authenticated wireless communication between at least one available wireless device in communication with the wireless network and the printer associated with the wireless network.

7. The printer of claim 1 further comprising:
    a data encryption protocol identifier configured to enable configuration of the printer for encrypted wireless communication between at least one available wireless device in communication with the wireless network and the printer associated with the wireless network.

8. The printer of claim 1 wherein the wireless configuration module comprises an automatic parameter configuration module to enable automatic configuration of the wireless security parameters for the printer after a wireless access point of the wireless network is selected by a user.

9. The printer of claim 1 wherein the printer further comprises a system including the printer and a computing device including a graphical user interface wherein the computing device is in wired communication with the printer for a limited period of time only to enable operation of the configuration module of the printer via the graphical user interface of the computing device and is no longer in wired communication with the printer after the printer is configured for association in the wireless network.

10. A printer comprising:
    a printer configuration module comprising:
        a query module configured to:
            query a plurality of simultaneously present wireless computing networks via a plurality of wireless devices,
            obtain a plurality of wireless network parameters associated with the plurality of wireless computing networks from the plurality of wireless devices based on the query, the plurality of wireless network parameters used to configure the printer for association with one of the wireless networks of the plurality of wireless computing networks; and
            identify wireless networks among the plurality of simultaneously present that are available for association with the printer based on the obtained plurality of wireless network parameters;

a user interface in communication with the printer configuration module, the user interface comprising:
an available network module configured to:
receive information about the identified wireless networks from the configuration module; and
display a list of the identified wireless networks based on the received information;
enable a user selection of a wireless network among the identified wireless networks displayed in the list for association of the printer in the wireless network;
send the selection of the wireless network to the printer configuration module in order for the printer configuration module to associate the printer in the selected wireless network.

11. The printer configuration module of claim 10 wherein the available network module comprises a selector module that is configured to enable the user selection of the wireless network.

12. The printer configuration module of claim 11 wherein the selection of the wireless network comprise a user selection of a wireless access point to the wireless network; and
wherein the selector module is further configured to:
automatically select at least one wireless communication parameter associated with at least one setting of the selected wireless network for the printer after the user selects the wireless access point.

13. A method of associating a printer in a wireless computing network, the method comprising:
establishing wireless communication between a printer and a plurality of simultaneously present wireless networks, wherein the printer is configured to communicate with the plurality of wireless networks in accordance with at least one wireless security protocol;
electronically querying the plurality of wireless computing networks for wireless network parameters associated with the plurality of wireless computing networks and the wireless security protocol, the wireless network parameters used to configure the printer for association with one of the wireless computing networks among the plurality of wireless computing networks;
electronically receiving, at the printer, responses that include the wireless network parameters associated with the wireless computing networks;
identifying wireless networks among the plurality of simultaneously present wireless networks that are available for association with the printer based on the received responses;
displaying a list of the identified wireless networks;
enabling selection of a wireless network among the identified wireless networks displayed in the list for association of the printer in the selected wireless network;
associating the printer in the wireless network based on the selection of the wireless network.

14. The method of claim 13 further comprising:
connecting the printer to an external computing device to enable display the list of the identified wireless networks; and
disconnecting the printer from the external computing device after the printer is associated in the wireless computing network.

15. The method of claim 14 wherein the external computing device is not associated in the wireless computing network.

16. The method of claim 13 further comprising:
enabling selection of at least one setting of the selected wireless network, the at least one setting corresponding to at least one of a security protocol setting, an authentication key, and an encryption key;
wherein associating the printer in the wireless network is based further on the selection of the at least one setting of the selected wireless network.

17. The method of claim 13 wherein the at least one wireless security protocol comprises one of:
an 802.11x security protocol; and
an 802.11i security protocol.

18. A printer having a print mechanism, the printer comprising:
a wireless transceiver configured for communication with multiple simultaneously present wireless networks; and
a configuration module in communication with the wireless transceiver, the configuration module being configured to communicate according to at least one wireless communication security protocol and configured to:
determine wireless network parameters associated with the multiple wireless networks, the wireless network parameters comprising at least one of: available network names, available network devices, modes, and security parameters; and
identify wireless networks among the plurality of simultaneously present wireless networks that are available for association with the printer based on at least one of the determined wireless network parameters; and
a user interface in communication with the configuration module and configured to:
receive information about the identified wireless networks from the configuration module;
display at least part of the information about the wireless networks identified by the configuration module;
enable selection of a wireless network among the identified wireless networks displayed on the user interface for association of the printer in the wireless network; and
send the selection of the wireless network to the configuration module in order for the configuration module to associate the printer in the selected wireless network.

19. The printer of claim 18 wherein the configuration module comprises:
a wireless access point identifier configured to identify available wireless access points associated with the multiple wireless networks.

20. The printer of claim 19 wherein the wireless access point identifier identifies service set identifiers associated with the multiple wireless networks.

21. The printer of claim 18 wherein the configuration module comprises:
a network type identifier configured to identify each of the multiple wireless networks as an ad hoc network or an infrastructure network.

22. The printer of claim 18 wherein the configuration module comprises:
a security identifier configured to identify wireless communication security protocols associated with the wireless devices.

23. The printer of claim 18, wherein the user interface is configured to receive a user input for selection of the wireless network of the multiple wireless networks.

* * * * *